United States Patent [19]

Yamamoto et al.

[11] Patent Number: 5,262,219
[45] Date of Patent: Nov. 16, 1993

[54] COMPOSITE FILM HAVING SLIPPERY, ELECTRICALLY CONDUCTING SURFACE

[75] Inventors: Shinichi Yamamoto, Yashio; Masatoshi Tomiki, Koshigaya; Haruo Hatakeyama, Tokyo, all of Japan

[73] Assignee: Somar Corporation, Japan

[21] Appl. No.: 613,072

[22] Filed: Nov. 15, 1990

[30] Foreign Application Priority Data

Jun. 16, 1990 [JP] Japan ............................ 2-157826

[51] Int. Cl.$^5$ .................... G11B 5/72; B32B 3/14
[52] U.S. Cl. .................... 428/141; 428/142; 428/143; 428/341; 428/336; 428/334; 428/473.5; 428/477.7; 428/474.4; 428/483; 428/476.3; 428/500; 428/501; 428/502; 428/504; 428/505; 428/506; 428/477.4; 428/480; 428/525; 428/408; 428/340; 428/323; 428/327; 428/422; 428/421; 524/496; 524/520; 252/511
[58] Field of Search ............ 428/141, 142, 143, 341, 428/336, 334, 473.5, 477.7, 474.4, 483, 476.3, 500, 502, 502, 504, 505, 506, 477.4, 480, 525, 408, 340, 323, 327, 422, 421; 524/496, 520; 252/511

[56] References Cited

U.S. PATENT DOCUMENTS

| | | | |
|---|---|---|---|
| 4,146,031 | 3/1979 | Fujiyama et al. | 428/497 |
| 4,238,341 | 12/1980 | Kato et al. | 428/506 |
| 4,396,672 | 8/1983 | Adesko | 428/323 |
| 4,496,626 | 1/1985 | Kasuga et al. | 428/480 |
| 4,568,598 | 2/1986 | Bilkadi et al. | 428/141 |
| 4,587,150 | 5/1986 | Nishimatsu et al. | 428/141 |
| 4,775,571 | 10/1988 | Mizuno et al. | 428/141 |
| 4,842,917 | 6/1989 | Ohno et al. | 428/141 |
| 4,865,898 | 9/1989 | Fukuda et al. | 428/141 |
| 5,011,727 | 4/1991 | Kido et al. | 428/141 |

FOREIGN PATENT DOCUMENTS 1122434   5/1989   Japan .

Primary Examiner—Ellis P. Robinson
Assistant Examiner—William P. Watkins, III
Attorney, Agent, or Firm—Lorusso & Loud

[57] ABSTRACT

A composite film is disclosed which includes (a) a synthetic resin substrate film having a roughened surface, and (b) a thin, slippery, electrically conducting layer coated over the roughened surface. The conducting layer contains 2-10% by weight of carbon black, 10-40% by weight of a fluorine resin, 25-78% by weight of a hardened binder resin selected from hardened amino resins, hardened phenol resins and mixtures thereof, and 7-25% by weight of a modifying resin selected from polyurethane resins, acrylic resins, polyester resins and mixtures thereof, the total amount of the hardened binder resin and the modifying resin being 50-85% by weight.

8 Claims, No Drawings

COMPOSITE FILM HAVING SLIPPERY, ELECTRICALLY CONDUCTING SURFACE

BACKGROUND OF THE INVENTION

1. Field of the Invention

This invention relates to a composite film having a slippery, electrically conducting surface suitable for use as a member to be subjected to a sliding contact with a plastic tape, such as a video tape, or as a light-blocking film such as a shutter or a diaphragm of cameras.

2. Description of Prior Art

Japanese Published Unexamined Patent Application (Tokkyo Kokai) No. Hei-1-122434 discloses a composite film with a slippery, electrically conducting surface, which includes a plastic film substrate coated with a layer containing carbon black, a fluorine resin and a hardened phenol or amino resin. While this composite film is cheap in manufacturing cost and is low in static friction, it is necessary to increase the thickness of the coating to about 4 μm in order to obtain satisfactory conductivity. As a result, the composite film is apt to spontaneously curl and is easily curled when wound around a roll.

SUMMARY OF THE INVENTION

It is, therefore, an object of the present invention to provide a composite film whose surface has good electrical conductivity, good abrasion resistance and low static friction and which has a reduced tendency to spontaneously curl.

Another object of the present invention is to provide a composite film of the above-mentioned type which has excellent adhesion between the substrate and the coating.

It is a further object of the present invention to provide a composite film of the above-mentioned type which is low in light reflection and may be suitably used as a light-blocking film.

In accordance with the present invention, there is provided a composite film comprising:

(a) a synthetic resin substrate film having a roughened surface with a roughness of 0.4–1.5 μm in terms of center line average height, and (b) a slippery, electrically conducting layer coated over said roughened surface in an amount of 1–3 g per 1 m² of said roughened surface and having a roughness of 0.3–1.4 μm in terms of center line average height, said conducting layer containing 2–10% by weight of carbon black, 10–40% by weight of a fluorine resin, 25–78% by weight of a hardened binder resin selected from the group consisting of hardened amino resins, hardened phenol resins and mixtures thereof, and 7–25% by weight of a modifying resin selected from the group consisting of polyurethane resins, acrylic resins, polyester resins and mixtures thereof, the total amount of said hardened binder resin and said modifying resin being 50–85% by weight.

Other objects, features and advantages of the present invention will become apparent from the detailed description of the invention to follow.

DETAILED DESCRIPTION OF THE INVENTION

The composite film according to the present invention includes a substrate and a coating provided over a surface of the substrate. A synthetic resin film is used as the substrate for supporting the coating thereon. One or both surfaces of the film are finely roughened to have a roughness of 0.4–1.5 μm, preferably 0.5–1.0 μm, in terms of center line average height (Japanese Industrial Standards JIS B601). Such roughened surfaces may be obtained by chemically or mechanically such as by chemical etching or a sand blast method. The sand blast method is particularly preferably adopted since it gives a roughened surface free of pin holes.

The roughening of the surface of the substrate is very important in order to obtain a composite film having good adhesion between the substrate and the coating, good electrical conductivity and low static friction. Provision of a primer layer between a substrate and a conductive coating could improve adhesion therebetween without using a roughened substrate. In this case, however, it is necessary to increase the thickness of the coating in order to obtain satisfactory electrical conductivity. In contrast, the use of such a surface-roughened substrate can reduce the thickness of the coating to, for example, 1 μm or less while improving the conductivity and surface slippage. In terms of light reflection, the roughened surface of the substrate has a roughness of 15% or less, preferably 2–10%.

Any synthetic resin film may be used as the substrate. Examples of the synthetic resin films include, polyolefin resin films, polyester resin films, polyamide resin films and polyamide resin films. The use of a film formed of a polyester resin such as poly(ethylene terephthalate) is preferred. The synthetic resin film substrate generally has a thickness of 25–250 μm. The substrate may contain a black, light-blocking substance such as carbon black.

On the roughened surface of the substrate is provided a slippery, electrically conducting layer containing 2–10% by weight of carbon black, 10–40% by weight of a fluorine resin, 25–78% by weight of a hardened binder resin, and 7–25% by weight of a modifying resin selected from the group consisting of polyurethane resins, acrylic resins, polyester resins and mixtures thereof. Such a conducting layer may be obtained by applying to the roughened surface of the substrate a coating liquid containing a thermosetting binder resin, carbon black, a fluorine resin and a modifying resin, the applied coating being subsequently dried and heated for hardening the thermosetting resin.

As the thermosetting binder resin, a water soluble amino resin, a water soluble phenol resin or a mixture thereof is used. Illustrative of suitable amino resins are anilinealdehyde resins, urea resins and melamine resins. Illustrative of suitable phenol resins are phenol-formaldehyde resins, phenol-furfural resins and resorcinol-formaldehyde resins. These binder resins can provide the slippery, conducting layer with high mechanical strengths and high resistance to solvents.

The modifying resin is selected from polyurethane resins, acrylic resins, polyester resins and mixtures thereof. Both water soluble and insoluble modifying resins may be used for the purpose of the present invention. The use of the modifying resin in conjunction with the binder resin serves to prevent curling of the composite film. The binder resin is used in an amount of 25–78% by weight, preferably 40–70% by weight and the modifying resin is used in an amount of 7–25% by weight, preferably 10–20% by weight based on the total amount of the conducting layer. An amount of the modifying resin in excess of 25% by weight is undesirable because the resulting coating becomes poor in resistance to solvents. At least 7% by weight is required in order to prevent the conducting layer from curling. The total amount of the binder resin and the modifying resin is 50-85% by weight, preferably 60-80% by weight based on the weight of the conducting layer. Any carbon black may be suitably used in the present invention as long as it exhibits electrical conductivity. The average particle size of carbon black is generally 1 μm or less, preferably 0.05-0.5 μm. Carbon black is present in an amount of 2-10% by weight, preferably 2-7% by weight based on the amount of the conducting layer.

As the fluorine resin, polytetrafluoroethylene is suitably used. The particle size of the fluorine resin is generally 5 μm or less, preferably 0.1-2 μm. The fluorine resin serves to lower the static friction of the coating and, thus, to impart slippage thereto. The fluorine resin is present in an amount of 10-40% by weight, preferably 20-30% by weight based on the amount of the conducting layer. The proportion of the carbon black relative to the fluorine resin is 6:100 to 70:100, preferably 7:100 to 30:100.

For the purpose of facilitating the curing of the coating, it is preferable to incorporate a curing catalyst into the coating liquid. A substance capable of generating an acid upon being heated, such as ammonium chloride or ammonium sulfate, may be suitably used as the curing catalyst. The coating liquid may further contain a surfactant to facilitate coating operations and a pH controlling agent such as aqueous ammonia to stabilize the coating liquid.

The coating liquid may be applied to the roughened surface of the substrate by any known method such as a wire bar method. The coating is then dried and heated at a temperature and for a period of time sufficient to harden the thermosetting binder resin, preferably at 100°-130° C. for 0.5-3 minutes.

The coating liquid is applied to the roughened surface in such an amount that the resulting hardened layer (i.e. slippery, conducting layer) is present in an amount of 1-3 g, preferably 1.5-2 g per 1 $m^2$ of the roughened surface (i.e. that portion of the substrate film on the surface of which the hardened layer is provided). The thickness of the conducting layer is preferably 1 μm or less. Because of its thinness and because of the surface roughness of its adjacent substrate, the conducting layer has a surface roughness of 0.3-1.4 μm, preferably 0.4-1.0 μm, in terms of center line average height.

The composite film according to the present invention is suitably used as a member to be subjected to friction. For example, the composite film, cut into a length of a tape, may be used as a pressing member for a video tape or the like recording tape running along guide rolls. The pressing member is disposed to be brought into pressure and sliding contact with the running tape and to prevent the tape from being slackened between the guide rolls. When the substrate film is made black by containing a black pigment such as carbon black, the resulting composite film is suitably used as a light-blocking member such as a shutter or a diaphragm of cameras.

The following examples will further illustrate the present invention. In the examples, parts and percentages are by weight.

EXAMPLE 1

The following mixtures were prepared:
(A) A mixed solution composed of 34.1 parts of water and 2.6 parts of ethanol;

(B) A 80% aqueous solution of a melamine resin (methylolated melamine resin, SUMITEX RESIN M-3 manufactured by Sumitomo Chemical Corp.);

(C) An aqueous dispersion containing 7.3% of electrically conducting carbon black (average particle size: 0.1-0.2 μm), an anionic surfactant and 4.2% of a water soluble acrylic resin;

(D) An aqueous dispersion containing 18% of polytetrafluoroethylene (PTFE, average particle size: 0.3 μm) and 10% of a polyurethane resin; and (E) A 20% aqueous solution of ammonium chloride.

To mixed solution (A) were added 7.6 parts of solution (B), 5.9 parts of dispersion (C), 14.5 parts of dispersion (D) and 0.158 part of solution (E) and the mixture was homogeneously mixed to obtain a coating liquid. One surface of a poly(ethylene terephthalate) substrate film with a thickness of 100 μm was roughened by a sand blast method to provide a roughened surface having a center line average height of 0.6 μm. The coating liquid was then applied to the roughened surface and the coating was heated at 120° C. for 2 minutes to obtain a composite film having a conducting layer provided on the substrate film. The composition and the amount of the conducting layer are shown in Table 1 below. The thickness, or center line average height (Ra), surface resistivity, coefficient of static friction and reflectivity of the conducting layer were then measured. The conducting layer was further tested for its resistance to solvent and adhesion to the substrate film and the composite film was tested for its tendency to curl and resistance to curl in the following manners. The results were as summarized in Table 1.

Resistance to Solvent Test

The conducting layer is rubbed 50 times with sanitary cotton impregnated with ethanol. The rubbed surface is then observed to determine whether or not there is caused any change. Resistance to solvent is rated as follows:
A: No change
B: Slight change
C: Considerable change Abrasion Resistance Test Two sheets of the composite films are maintained in pressure contact with each other with a load of 50 g/$cm^2$, with their conducting layers facing to each other. While maintaining this state, the films are rubbed with each other 15,000 times at a moving speed of 20 cm/second. The rubbed surface of each film is then observed to determine whether or not there is caused abrasion or delamination of the conducting layer. Abrasion resistance of the conducting layer is rated as follows:
A: No abrasion or delamination
B: Slight abrasion and/or delamination
C: Considerable abrasion and/or delamination Tendency to Curl Test The composite film (30×50 mm) is placed on a flat glass plate disposed in a chamber maintained at a constant temperature of 50° C. and a constant relative humidity of 80% and is kept in this state for 3 hours. Then, the glass plate having the film thereon is taken out of the chamber and is allowed to stand at room temperature for 1 hour. The height of the edge of the film from the surface of the glass plate is measured. Tendency to curl is rated as follows:
A: less than 1 mm (no curl)
B: 1-2 mm (slight curl)
C: over 2 mm (considerable curl)

Resistance to Curl Test

The composite film (50×300 mm) is wound around a paper roll (outer diameter: 82 mm) and fixed by means of an adhesive tape. After 1 hour, the film is released from the roll and placed on a flat table. The height of the edge of the film from the surface of the table is measured. Resistance to curl is rated as follows:

A: less than 20 mm
B: 20-30 mm
C: over 30 mm

COMPARATIVE EXAMPLE 1

Example 1 was repeated in the same manner as described except that, as a substrate film, a smooth poly(ethylene terephthalate) film was used as such without being subjected to the surface roughening treatment. The properties of the resulting composite film are shown in Table 1.

EXAMPLE 2

The mixtures (A)-(E) used in Example 1 were used. To mixed solution (A) were added 7.6 parts of solution (B), 3.9 parts of dispersion (C), 14.8 parts of dispersion (D) and 0.158 part of solution (E) and the mixture was homogeneously mixed to obtain a coating liquid. Using this coating liquid a composite film was prepared in the same manner as described in Example 1. The properties of the composite film are shown in Table 1.

COMPARATIVE EXAMPLE 2

Example 2 was repeated in the same manner as described except that, as a substrate film, a smooth poly(ethylene terephthalate) film was used as such without being subjected to the surface roughening treatment. The properties of the resulting composite film are shown in Table 1.

COMPARATIVE EXAMPLE 3

The mixtures (B)-(E) used in Example 1 were used. To 87 parts of water were added 19 parts of solution (B), 8.3 parts of dispersion (C), 7.5 parts of dispersion (D) and 3 parts of solution (E) and the mixture was homogeneously mixed to obtain a coating liquid. Using this coating liquid a composite film was prepared in the same manner as described in Example 1. The properties of the composite film are shown in Table 1.

COMPARATIVE EXAMPLE 4

Example 3 was repeated in the same manner as described except that, as a substrate film, a smooth poly(ethylene terephthalate) film was used as such without being subjected to the surface roughening treatment. The properties of the resulting composite film are shown in Table 1.

COMPARATIVE EXAMPLE 5

Example 3 was repeated in the same manner as described except that, as a substrate film, a smooth poly(ethylene therephthalate) film was used as such without being subjected to the surface roughening treatment and that the thickness of the conducting layer was increased to 4 $\mu$m. The properties of the resulting composite film are shown in Table 1.

COMPARATIVE EXAMPLE 6

Example 1 was repeated in the same manner as described except that the composition of the conducting layer was varied as shown in Table 1. The properties of the resulting composite film are shown in Table 1.

COMPARATIVE EXAMPLE 7

Example 1 was repeated in the same manner as described except that the composition of the conducting layer was varied as shown in Table 1. The properties of the resulting composite film are shown in Table 1.

EXAMPLE 3

Example 1 was repeated in the same manner as described except that a poly(ethylene terephthalate) was used in place of the acrylic resin in dispersion (C). The resulting composite film was found to exhibit properties similar to that of Example 1.

TABLE 1

| Example No. | 1 | | 2 | | | | | | |
| Comp. Ex. No. | | 1 | | 2 | 3 | 4 | 5 | 6 | 7 |
| --- | --- | --- | --- | --- | --- | --- | --- | --- | --- |
| Composition (%) | | | | | | | | | |
| Melamine resin | 56 | 56 | 57 | 57 | 83.3 | 83.3 | 83.3 | 59 | 25 |
| Carbon black | 4 | 4 | 2.5 | 2.5 | 3.3 | 3.3 | 3.3 | 1.5 | 5 |
| PTFE | 24 | 24 | 25 | 25 | 7.3 | 7.3 | 7.3 | 25 | 43 |
| Acrylic resin | 16 | 16 | 15.5 | 15.5 | 6.1 | 6.1 | 6.1 | 14.5 | 27 |
| Properties | | | | | | | | | |
| Ra ($\mu$m) | 0.54 | — | 0.54 | — | 0.54 | — | — | 0.54 | 0.54 |
| Thickness ($\mu$m) | — | 1 | — | 1 | 1 | 1 | 4 | — | — |
| Amount (g/m$^2$) | 1.2 | 1.2 | 1.7 | 1.2 | 1.6 | 1.0 | 3.8 | 1.7 | 1.7 |
| Resistivity ($\Omega$/cm$^2$) | $10^5$ | $10^7$ | $10^6$ | $>10^{12}$ | $10^6$ | $10^{11}$ | $10^5$ | $>10^{12}$ | $10^5$ |
| Static Friction | 0.2 | 0.3 | 0.2 | 0.3 | 0.65 | 0.8 | 0.3 | 0.2 | 0.2 |
| Reflectivity (%) | 2.4 | 22 | 2.4 | 44.5 | 2.4 | 31.5 | 18.6 | 2.4 | 2.4 |
| Solvent Resistance | A | A | A | A | A | A | A | A | B |
| Abrasion Resistance | A | B | A | B | A | B | B | A | B |
| Curl Tendency | A | A | A | A | A | A | C | A | A |
| Resistance to Curl | A | A | A | A | C | C | C | A | A |

What is claimed is:

1. A composite film comprising:
   (a) a synthetic resin substrate film having a roughened surface with a roughness of 0.4-1.5 $\mu$m in terms of center line average height, and
   (b) a slippery, electrically conducting layer coated over said roughened surface in an amount of 1-3 g per 1 m$^2$ of said roughened surface and having a roughness of 0.3-1.4 $\mu$m in terms of center line average height, said conducting layer containing 2-10% by weight of carbon black, wherein said carbon black has electrical conductivity, 10-40% by weight of fluorine resin particles, 25-78% by weight of a hardened thermoset resin selected from the group consisting of amino resins, phenol resins and mixtures thereof, and 7-25% by weight of modifying resin selected from the group consisting of polyurethane resins, acrylic resins, polyester resins and mixtures thereof, the total amount of said hardened resin and said modifying resin being 50-85% by weight, wherein the weight ratio of carbon black to fluorine resin is 6:100 to 70:100.

2. A composite film according to claim 1, wherein the center line average heights of said roughened surface and said slippery layer are 0.5-1.0 μm and 0.4-1.0 μm, respectively.

3. A composite film according to claim 1, wherein said slippery layer is present in an amount of 1.5-2 g per 1 m² of said roughened surface.

4. A composite film according to claim 1, wherein said conducting layer contains 2-7% by weight of carbon black, 20-30% by weight of a fluorine resin, 30-70% by weight of the hardened resin, and 10-20% by weight of the modifying resin, the total amount of said hardened resin and said modifying resin being 60-80% by weight.

5. A composite film according to claim 1, wherein said substrate film is formed of a polyolefin, a polyester, a polyamide or a polyimide.

6. A composite film according to claim 1, wherein said substrate film contains a black colorant so that said substrate film is impervious to light.

7. A composite film according to claim 1, wherein said conducting layer has a thickness of 1 μm or less.

8. A composite film in accordance with claim 1 consisting of layers (a) and (b) only.

* * * * *

UNITED STATES PATENT AND TRADEMARK OFFICE
CERTIFICATE OF CORRECTION

PATENT NO.   : 5,262,219
DATED        : November 16, 1993
INVENTOR(S)  : YAMAMOTO et al It is certified that error appears in the above-indentified patent and that said Letters Patent is hereby corrected as shown below:

Col. 2, line 28, delete "polyamide" and insert

--polyimide--.

Signed and Sealed this

Twelfth Day of July, 1994

*Attest:*

BRUCE LEHMAN

*Attesting Officer*    Commissioner of Patents and Trademarks